United States Patent
Ulu et al.

(10) Patent No.: US 11,928,407 B2
(45) Date of Patent: *Mar. 12, 2024

(54) SYSTEM AND METHOD FOR DETERMINING SPATIAL DISTRIBUTION OF VARIABLE DEPOSITION SIZE IN ADDITIVE MANUFACTURING

(71) Applicant: PALO ALTO RESEARCH CENTER INCORPORATED, Palo Alto, CA (US)

(72) Inventors: Erva Ulu, Sunnyvale, CA (US); Nurcan Gecer Ulu, Sunnyvale, CA (US); Walter Hsiao, San Mateo, CA (US); Nelaturi Saigopal, Mountain View, CA (US)

(73) Assignee: XEROX CORPORATION, Norwalk, CT (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/089,831

(22) Filed: Dec. 28, 2022

(65) Prior Publication Data

US 2023/0306161 A1  Sep. 28, 2023

Related U.S. Application Data

(63) Continuation of application No. 16/714,923, filed on Dec. 16, 2019, now Pat. No. 11,580,278.

(Continued)

(51) Int. Cl.
*G06F 30/23* (2020.01)
*B22F 10/00* (2021.01)
(Continued)

(52) U.S. Cl.
CPC ............. *G06F 30/23* (2020.01); *B22F 10/00* (2021.01); *B22F 10/25* (2021.01); *B22F 10/36* (2021.01);
(Continued)

(58) Field of Classification Search
CPC ...... G06F 30/23; G06F 2113/10; B22F 10/00; B22F 10/25; B22F 10/36; B22F 10/80;
(Continued)

(56) References Cited

U.S. PATENT DOCUMENTS 5,597,520 A    1/1997  Smalley et al.
10,338,567 B2  7/2019  Guimbretiere et al.
(Continued)

OTHER PUBLICATIONS

Ahn et al., "Fabrication direction optimization to minimize post-machining in layered manufacturing", International Journal of Machine Tools and Manufacture, vol. 47, Issue 3-4, Mar. 2007, pp. 596-606.

(Continued)

*Primary Examiner* — Michael J Brown
(74) *Attorney, Agent, or Firm* — Mueting Raasch Group

(57) ABSTRACT

A three-dimensional object model is divided into slices that are targeted for an additive manufacturing process operable to deposit material at a variable deposition size ranging between minimum and maximum printable feature sizes. For each of the slices, a thinning algorithm is applied to contours of the slice to form a meso-skeleton. Topological features of the thinned slice are reduced over a number of passes such that a portion of the meso-skeleton is reduced to a single pixel wide line. Based on the number of passes, a slice-specific printable feature size within the range of the minimum and maximum printable feature sizes is determined. An adjusted slice is formed by sweeping the meso-skeleton with the slice-specific printable feature size. The adjusted slices are assembled into an object model which is used to create a manufactured object.

20 Claims, 12 Drawing Sheets

Related U.S. Application Data

(60) Provisional application No. 62/884,763, filed on Aug. 9, 2019.

(51) Int. Cl.
| | |
|---|---|
| *B22F 10/25* | (2021.01) |
| *B22F 10/36* | (2021.01) |
| *B22F 10/80* | (2021.01) |
| *B29C 64/153* | (2017.01) |
| *B29C 64/182* | (2017.01) |
| *B29C 64/209* | (2017.01) |
| *B29C 64/321* | (2017.01) |
| *B29C 64/343* | (2017.01) |
| *B29C 64/393* | (2017.01) |
| *B22F 10/10* | (2021.01) |
| *B22F 10/12* | (2021.01) |
| *B22F 10/18* | (2021.01) |
| *B22F 10/28* | (2021.01) |
| *B33Y 10/00* | (2015.01) |
| *B33Y 30/00* | (2015.01) |
| *B33Y 50/02* | (2015.01) |
| *B33Y 80/00* | (2015.01) |
| *G06F 113/10* | (2020.01) |

(52) U.S. Cl.
CPC .......... *B22F 10/80* (2021.01); *B29C 64/153* (2017.08); *B29C 64/182* (2017.08); *B29C 64/209* (2017.08); *B29C 64/321* (2017.08); *B29C 64/343* (2017.08); *B29C 64/393* (2017.08); *B22F 10/10* (2021.01); *B22F 10/12* (2021.01); *B22F 10/18* (2021.01); *B22F 10/28* (2021.01); *B33Y 10/00* (2014.12); *B33Y 30/00* (2014.12); *B33Y 50/02* (2014.12); *B33Y 80/00* (2014.12); *G05B 2219/49023* (2013.01); *G06F 2113/10* (2020.01)

(58) Field of Classification Search
CPC .......... B22F 10/10; B22F 10/12; B22F 10/18; B22F 10/28; B29C 64/153; B29C 64/182; B29C 64/209; B29C 64/321; B29C 64/343; B29C 64/393; B33Y 10/00; B33Y 30/00; B33Y 50/02; B33Y 80/00; G05B 2219/49023
USPC .......................................................... 700/98
See application file for complete search history.

(56) References Cited

U.S. PATENT DOCUMENTS

| | | | |
|---|---|---|---|
| 10,571,895 | B2 | 2/2020 | Su et al. |
| 11,580,278 | B2 * | 2/2023 | Ulu .................. B22F 10/25 |
| 2016/0059485 | A1 | 3/2016 | Ding et al. |
| 2016/0288426 | A1 | 10/2016 | Yoshida |
| 2017/0036395 | A1 | 2/2017 | Sanz |
| 2017/0038765 | A1 | 2/2017 | Yoshida |
| 2018/0104863 | A1 | 4/2018 | Cottrell et al. |
| 2018/0196407 | A1 | 7/2018 | Lee et al. |
| 2018/0229448 | A1 | 8/2018 | Bastian et al. |
| 2019/0022930 | A1 | 1/2019 | Hinch et al. |
| 2019/0084224 | A1 | 3/2019 | Guimbretiere et al. |

OTHER PUBLICATIONS

Alexander et al., "Part Orientation and Build Cost Determination in Layered Manufacturing", Computer-Aided Design, vol. 30, Issue 5, Apr. 1998, pp. 343-356.

Attene et al., "Polygon Mesh Repairing: An Application Perspective", ACM Computing Surveys, vol. 45, No. 2, Feb. 2013, 37 pages.

Ezair et al., "Orientation analysis of 3D objects toward minimal support volume in 3D-printing", Computer & Graphics 51, 2017, pp. 117-124.

Guo et al., "Parallel Thinning with Two-Subiteration Algorithms", Communications of the ACM, vol. 32, No. 3, Mar. 1989, pp. 359-373.

Hildebrand et al., "Orthogonal slicing for additive manufacturing", Computer & Graphics, vol. 37, Issue 6, Oct. 2013, pp. 669-675.

Jaiswal, "A Geometric Reasoning Approach for Additive Manufacturing Print Quality Assessment and Automated Model Correction", Computer-Aided Design, Vo;. 109, Apr. 2019, pp. 1-11.

Ju, "Robust Repair of Polygonal Models", ACM Siggraph, 2004, pp. 888-895.

Kirkpatrick et al., "Optimization by Simulated Annealing", Science, vol. 220, No. 45998, May 13, 1983, pp. 671-680.

Lam et al., "Thinning Methodologies—A Comprehensive Survey", IEEE Transactions on Pattern Analysis and Machine Intelligence, vol. 14, No. 9, Sep. 1992, pp. 869-885.

Morgan et al., "Part orientation optimisation for the additive layer manufacture of metal components", Int. J. Adv Manuf Technol, vol. 86, 2016, pp. 1679-1687.

Nelaturi et al., "Manufacturability Feedback and Model Correction for Additive Manufacturing", J. Manuf. Sci. Eng., vol. 137(2), Apr. 2015, 9 pages.

Shi et al., Manufacturability Analysis for Additive Manufacturing Using a Novel Feature Recognition Technique{, Computer-Aided Design and Application, Apr. 2018, pp. 1-14.

Tedia et al., Manufacturability Analysis Tool for Additive Manufacturing Using Voxel-Based Geometric Modeling:, Proceeding of the 27th Annual International Solid Freeform Fabrication Symposium, 2016, 5 pages.

Telea, "Voxel-Based Assessment of Printability of 3D Shapes", International Symposium on Mathematical Morphology and Its Applications to Signal and Image Processing, 2011, pp. 393-404.

Ulu et al., "Concurrent Structure and Process Optimization for Minimum Cost Metal Additive Manufacturing", Journal of Mechanical Design, vol. 141, No. 6, Nov. 2018, 13 pages.

Ulu et al., "Enhancing the Structural Performance of Additively Manufactured Objects Through Build Orientation Optimization" J. Mech. Des. 137(11), Nov. 2015, 9 pages.

Ulu et al., "Manufacturability Oriented Model Correction and Build Direction Optimization for Additive Manufacturing", arXiv.org, 1909.11620, Sep. 2019, 10 pages.

Umentani et al., "Cross-sectional structural analysis for 3D printing optimization", SA '13 SIGGRAPH, Asia 2013 Technical Brief, No. 5, 2013, 4 pages.

Wang et al., "Improved Surface Quality in 3D Printing by Optimizing the Printing Direction", Eurographics, vol. 35, No. 2, 2016, 12 pages.

Zhang et al., "Perceptual models of preference in 3D printing direction", ACM Transactions on Graphics, vol. 34, Issue 6, Nov. 2015, 12 pages.

* cited by examiner

```
ALGORITHM 1: Shape modification algorithm
─────────────────────────────────────────
    Input  : $\mathcal{B}, F$
    Output : $\hat{\mathcal{B}}$
    $\mathcal{V} \leftarrow$ Voxelize $\mathcal{B}$;
    $\hat{\mathcal{V}} \leftarrow \emptyset$;
    foreach Slice $S_j \in \oplus \mathcal{V}$ do
        $\hat{M}_j \leftarrow$ Compute meso-skeleton;
        $\hat{S}_j \leftarrow M_j \oplus F$;
        Append $\hat{S}_j$ to $\hat{\mathcal{V}}$;
    end
    $\hat{\mathcal{B}} \leftarrow$ Compute boundary surface of $\hat{\mathcal{V}}$;
```

FIG. 4

```
ALGORITHM 2: Meso-skeleton computation algorithm
─────────────────────────────────────────────────
    Input  : $S_j, F$
    Output : $\hat{M}_j$
    $E_j \leftarrow S_j \ominus F$;
    $p\hat{M}_j \leftarrow \emptyset$;
    $\hat{M}_j \leftarrow S_j$;
    $j \leftarrow 0$;
    while $\hat{M}_j \neq p\hat{M}_j$ do
        $p\hat{M}_j \leftarrow \hat{M}_j$;
        Apply thinning to $\hat{M}_j$;
        if $j < d/2$ then
            Remove spur pixels in $\hat{M}_j$;
        end
        $\hat{M}_j \leftarrow \hat{M}_j \vee E_j$;
        $j \leftarrow j+1$;
    end
```

FIG. 5

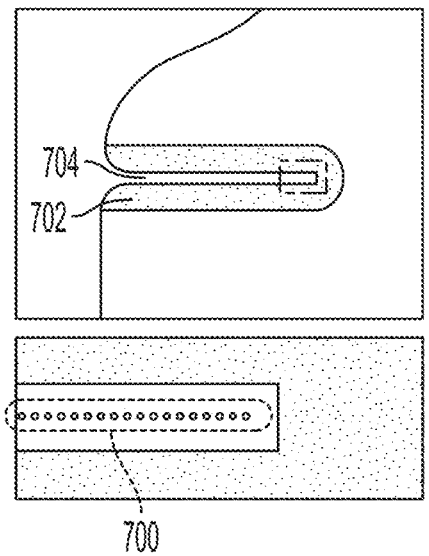
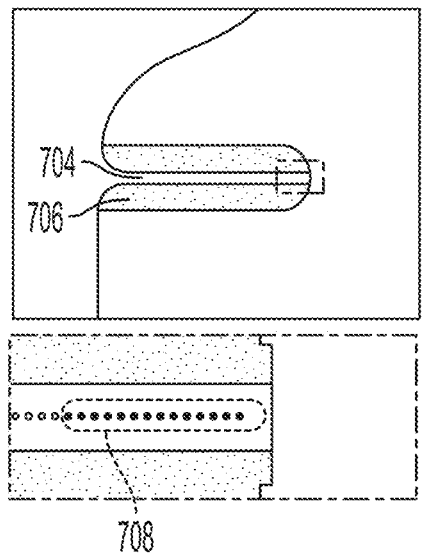
FIG. 7A    FIG. 7B
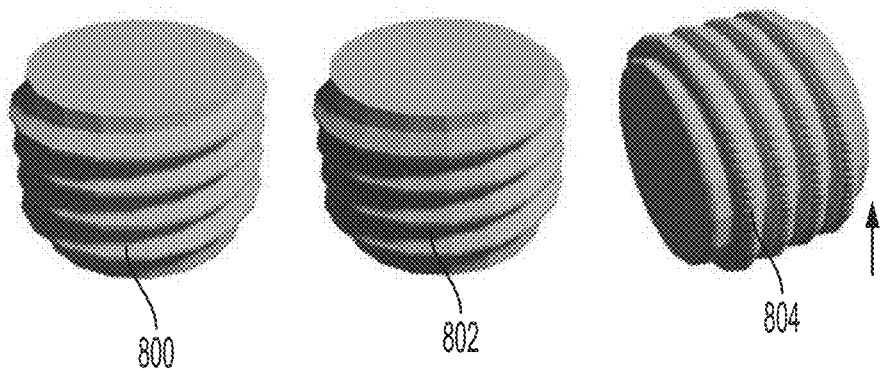
FIG. 8

SYSTEM AND METHOD FOR DETERMINING SPATIAL DISTRIBUTION OF VARIABLE DEPOSITION SIZE IN ADDITIVE MANUFACTURING

RELATED PATENT DOCUMENTS

This application is a continuation application of U.S. application Ser. No. 16/714,923, filed Dec. 16, 2019, which claims the benefit of U.S. Provisional Application No. 62/884,763, filed on Aug. 9, 2019, both of which are incorporated herein by reference in their entireties.

This invention was made with government support under contract number HR0011-17-2-0015 awarded by DARPA. The government has certain rights in the invention.

SUMMARY

The present disclosure is directed to a system and method for determining spatial distribution of variable deposition size in additive manufacturing. In one embodiment, a three-dimensional object model is divided into a plurality of slices. The slices are targeted for an additive manufacturing process operable to deposit material at a variable deposition size ranging between minimum and maximum printable feature sizes. For each of the slices, a thinning algorithm is applied to one or more contours of the slice to form a meso-skeleton. Topological features of the thinned slice are reduced over a number of passes each reducing the one or more contours such that at least a portion of the meso-skeleton is reduced to a single pixel wide line. Based on the number of passes, a slice-specific printable feature size within the range of the minimum and maximum printable feature sizes is determined. An adjusted slice is formed by sweeping the meso-skeleton with the slice-specific printable feature size. The adjusted slices are assembled into an object model which is used to create a manufactured object using the additive manufacturing process such that the adjusted slices are added to the manufactured object using the respective slice-specific printable feature sizes.

These and other features and aspects of various embodiments may be understood in view of the following detailed discussion and accompanying drawings.

BRIEF DESCRIPTION OF THE DRAWINGS

The discussion below makes reference to the following figures, wherein the same reference number may be used to identify the similar/same component in multiple figures. The drawings are not necessarily to scale.

FIGS. 4 and 5 are pseudo-code listings of algorithms according to example embodiments;

FIG. 7A-7B are diagrams showing correction applied to a spur feature using an algorithm according to an example embodiment;

FIG. 8 is a set of images showing effects of build orientation on a model according to an example embodiment;

DETAILED DESCRIPTION

The present disclosure relates to additive manufacturing (AM). Recent advances in additive manufacturing technologies have triggered the development of powerful design methodologies allowing designers to create highly complex functional parts. Many such methods often operate under the assumption that any designed shape can be fabricated, e.g., using a 3D printer, and the resulting part matches the designed shape perfectly or with negligible errors. In reality, however, the selected AM process, mechanical characteristics of the printer or the material being used may introduce significant limitations to printability of a particular design in the form of a minimum printable feature size.

For instance, the minimum feature size might be relatively large for a consumer level fused deposition modeling (FDM) printer while an order of magnitude smaller features could be achieved with a high-end stereolithography (SLA) printer. Similarly, in electron beam melting (EBM) process, higher beam power leads to a larger melt pool, thereby resulting in a larger minimum printable feature size. Therefore, attempting to manufacture a complex shape with very small features using a consumer level FDM printer or an EBM machine with high beam power settings could lead to poor quality parts or even complete failure of the print.

In order to avoid such problems during the printing process, the manufacturing constraints should be taken into account during the design stage and the shape modified accordingly to ensure the product conforms as closely as possibly to the desired shape. This disclosure describes methods for analyzing and altering the designed geometry to make it manufacturable with the intended 3D printing approach and corresponding process parameters. The methods take as input a 3D shape represented by its boundary surface mesh and a minimum printable feature size dictated by the manufacturing process. The methods produce, based on this input, a corrected model that accurately approximates the as-manufactured part which can be 3D printed without any failures.

Figure 1:
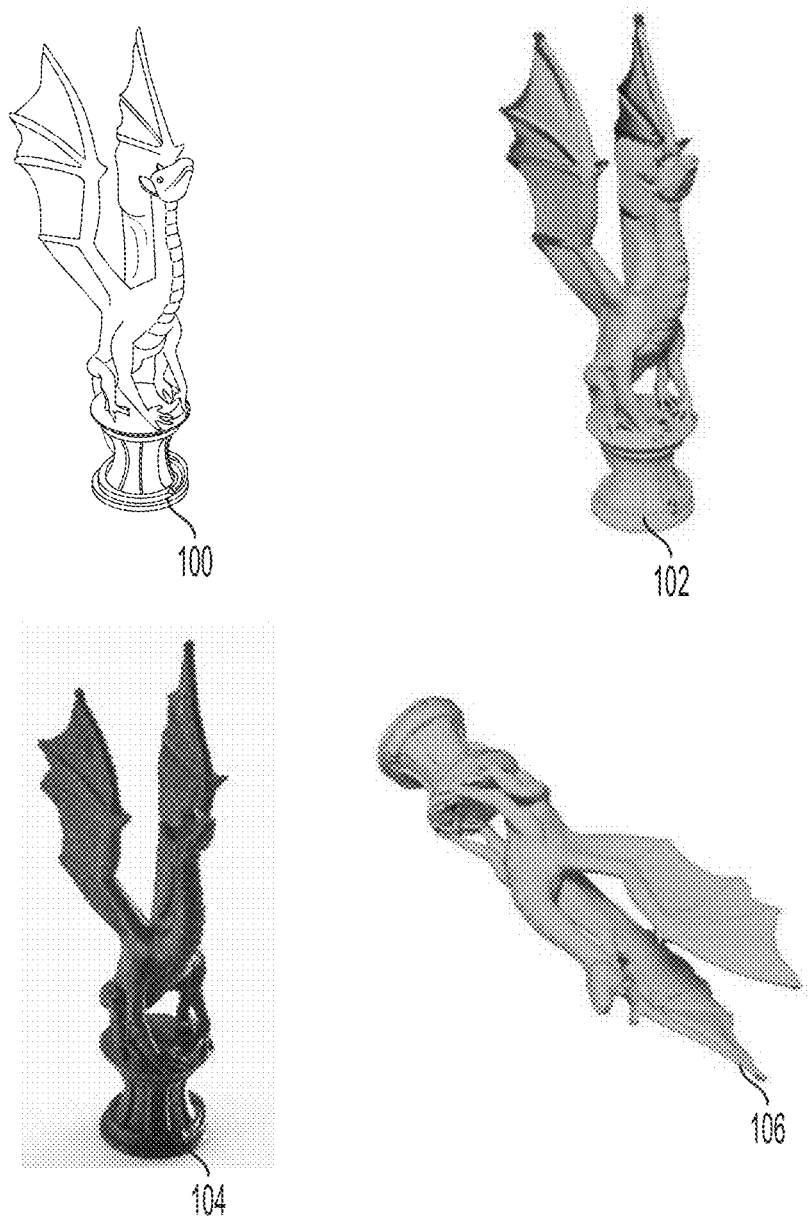
FIG. 1 is a set of images of additive manufacturing models and a resulting manufactured product according to an example embodiment.

For example, in FIG. 1, a 3D input model 100 is shown as-designed, e.g., using a computer-aided design (CAD) program. Another view 102 of the model is shown with darker shaded areas indicating material that is added or removed to avoid fabrication errors due to minimum feature size. Image shows 104 the resulting manufactured item made using these modifications to the model. Image 106 shows the model in an orientation that can be shown to be an optimal build direction.

In analyzing and correcting a model for manufacturability, one challenge lies in identifying the important features and determining the modifications to the design that affects the shape minimally. An approach that overcomes this challenge involves constructing a meso-skeleton—the maximal area within each slice where a print head can be positioned during the printing process—that is topologically equivalent to the corresponding slice of the input shape. This approach allows thickening of topologically important parts that are smaller than the minimum printable size by creating a minimal path for the print head to deposit material. The modifications can be minimized by optimizing the build orientation of the part. This approach can operate on the slice level, simulating the layer-by-layer printing process. In this way, the resulting geometry accurately approximates the printed part revealing the downstream geometric changes in a design-to-manufacturing pipeline.

The disclosure generally describes a topology-aware model correction method for manufacturability. A meso-skeleton is constructed that serves as a proxy to the maximal area that the print head can traverse. A build orientation selection algorithm can be used minimize the amount of required shape modifications. Automatic techniques offering design aids in creating shapes that satisfy a variety of fabrication related constraints are known. Recent examples include partitioning and packing approaches to accommodate large prints, advanced slicing methods to improve the print quality and build time, automatic support structure design methods as well as shape modification approaches to minimize or avoid support structures. Other shape modification approaches have been explored to meet geometric requirements such as minimum feature size or wall thickness.

2.1 Design for Fabrication Constraints

Some existing approaches to create shapes that satisfy fabrication related constraints include partitioning and packing approaches to accommodate large prints, advanced slicing methods to improve the print quality and build time, automatic support structure design methods as well as shape modification approaches to minimize or avoid support structures. Other shape modification approaches have been explored to meet geometric requirements such as minimum feature size or wall thickness. The present approach falls under a general category in that the geometry is altered to make a part manufacturable under the given minimum printable feature size limitations. The aim is to provide an accurate approximation of the as-manufactured part by performing a slice-based analysis to construct an allowable space for the print head to traverse during the 3D printing process.

2.2 Manufacturability Analysis and Model Correction

In the context of additive manufacturing, conventional manufacturability analysis approaches are often intended for detecting artifacts in the input surface mesh such as self-intersections, non-manifoldness and non-watertightness. However, even models free of such artifacts may not be 3D printable as the size of certain regions of the object might drop below the printing resolution. Morphological operations and distance transforms, ray casting and feature-recognition-based approaches have been presented recently to identify such problematic regions. Although these approaches are demonstrated to provide valuable design feedback to user by determining compatibility of a 3D model with the printing hardware, very few solutions exist to automatically modify the shape to mitigate these manufacturability problems.

For example, problematic regions can be identified using 2D shape diameter function and then, a physics-based mesh deformation technique is followed by a post-processing step using morphological operations is used to make local corrections to improve printability of the design. In this approach, small holes and narrow intrusions are aimed to be eliminated as a part of the correction process. While the provided corrective actions improve the design significantly, it has been shown that the printability is not guaranteed. Other techniques use medial axis transformation together with techniques from mathematical morphology to construct a printability map and recommend design modifications. However, as the medial axis computation is very sensitive to noise, many unwanted branches may be created, especially on high curvature regions such as corners. Therefore, a special care has to be taken to remove them.

In the approaches described herein, a skeletal structure is used to preserve topologically and geometrically important features when correcting the shapes for manufacturability. In order to address the sensitivity problems, thinning methodologies used in binary image processing are adapted here to construct a meso-skeleton on which to base an altered model.

2.3 Build Direction Selection

Effects of build orientation on the build time and cost, the amount of support material, the mechanical properties and the surface quality have been studied extensively and automatic build direction selection algorithms are proposed to minimize such directional biases. Other works focus on geometrical inaccuracies caused by the staircase artifacts inherent to layered manufacturing processes. Although driven by similar motivations, in this work, the build direction is optimized in order to minimize the amount of modifications required to make the shape manufacturable with the given manufacturing process. This formulation is complementary to the aforementioned methods in that they may be used together to improve manufacturability of a design while also targeting other objectives.

3. Shape Modifications

In a traditional additive manufacturing pipeline, the 3D model is sliced into layers and then, each layer is individually processed to generate a set of machine instructions, usually in the form of a toolpath plan. The sequence of the movements in toolpath aims to track the outer boundary of the slice as well as to fill the inner regions and possible support structures. The conventional approach in toolpath planning is to generate machine instructions such that the deposited material is restricted to the interior of the slice. For a given slice $S_i$ and a minimum printable feature F represented by a circle of diameter d, the maximal allowable region M that the print head can traverse can be calculated by the morphological erosion operation as shown in Equation (1). Therefore, the printed slice geometry $P_i$ can be approximated by the morphological opening of $S_i$ by F as shown in Equation (2) below, where $\oplus$ and $\ominus$ denote morphological erosion and dilation operations, respectively.

$$M_i = S_i \ominus F \qquad (1)$$

$$P_i = (S_i \ominus F) \oplus F \qquad (2)$$
$$= M_i \oplus F$$

Figure 2:
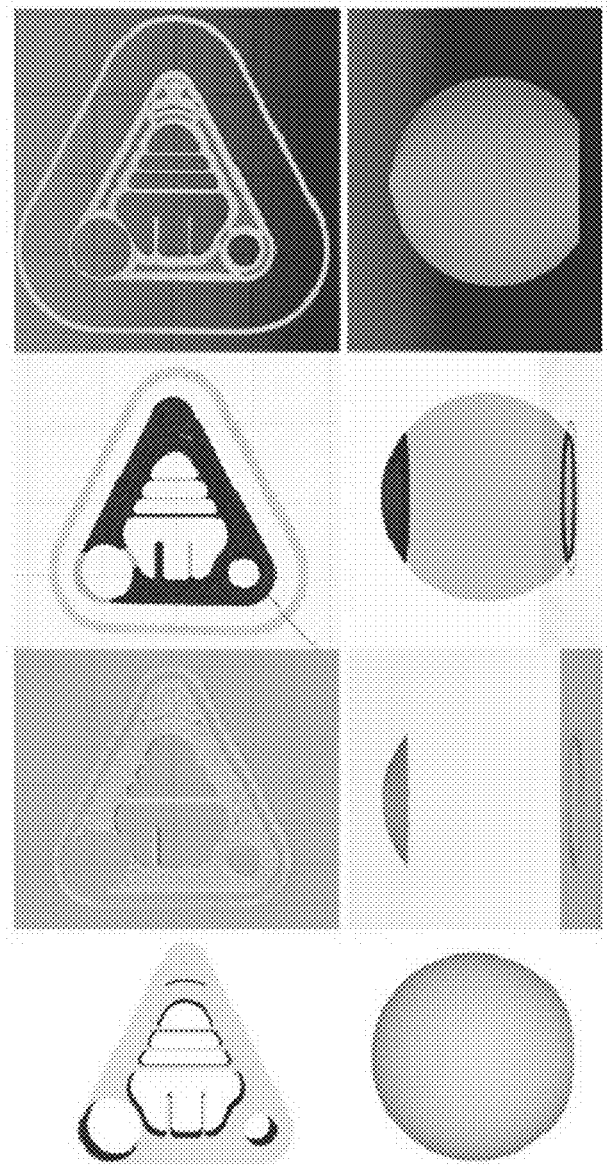
FIG. 2 is a set of images illustrating toolpaths generated by different slicer software for the models including thin features.

However, this approach causes features that are smaller than F to disappear in the created toolpath and thus, in the fabricated part. In FIG. 2, a diagram illustrates example cases and corresponding toolpaths generated by various slicer software commonly used for FDM process. The top row includes a test part with thin features and the bottom row includes a thin spherical shell. Left to right in FIG. 2, images represent the input model and toolpaths respectively generated by Simplify3D, Ultimaker Cura and Slic3r (Prusa edition). Note that in some cases, such as the thin spherical shell model, these problems manifest themselves as complete removal of layers and therefore, result in failure of the entire print process. Some slicers attempt to address this issue by performing corrective actions in toolpath level. For instance, Slic3r adjusts the filament feed rate to an amount below what is optimal to be able to print walls thinner than the nozzle diameter (FIG. 2, right column), or IceSL provides an option to thicken the critical regions by over-depositing material. However, modifications that are made in the toolpath level usually target a particular AM process (e.g., the above two examples target FDM process) and they may create ambiguities between what is designed and what is manufactured. Moreover, most commercial AM machines (such as Stratasys Objet or Dimension Elite) only support toolpath planning through their proprietary software that may not perform any corrective actions. Although the approaches described herein are similar to above mentioned tools in that they operate on slice level, the input model is corrected during the design stage, such that the design itself approximates the as-manufactured part as closely as possible and can be printed using the intended AM process.

Figure 3A:
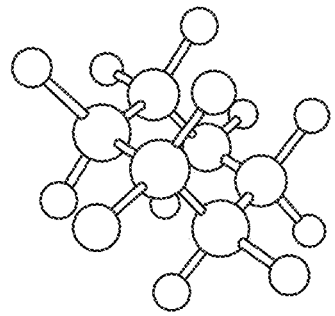
FIGS. 3A-3E are diagrams that outline a model correction approach according to an example embodiment.
Figure 3B:
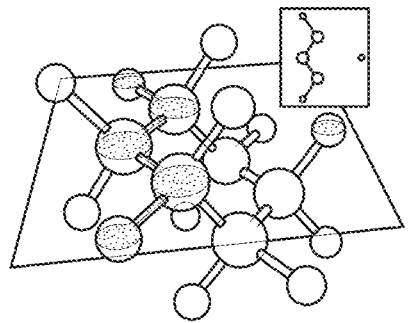
Figure 3C:
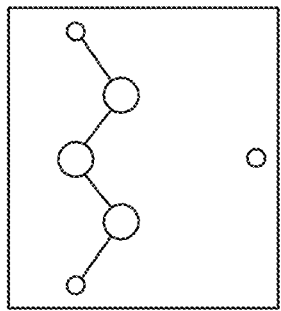
Figure 3D:
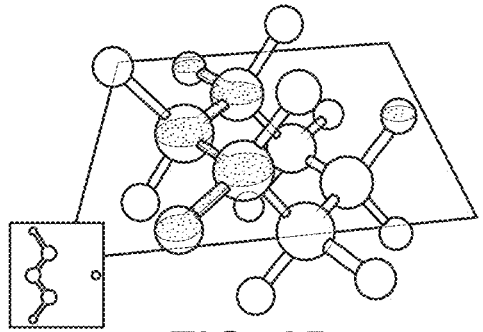
Figure 3E:
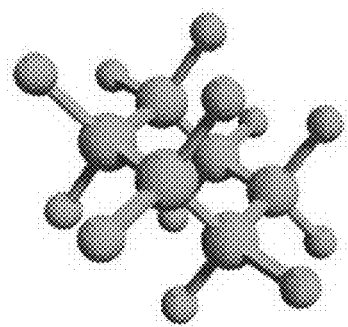
Figures 6A, 6B:
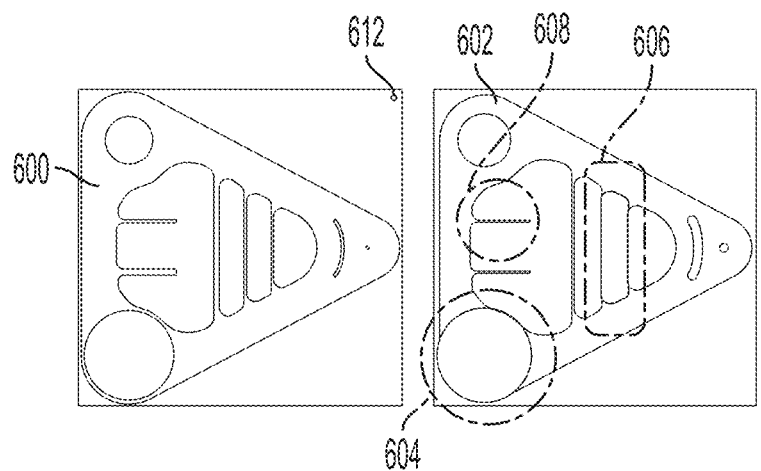
FIGS. 6A-6D are images showing the application of a correction algorithm to a part geometry according to an example embodiment.
Figures 6C, 6D:
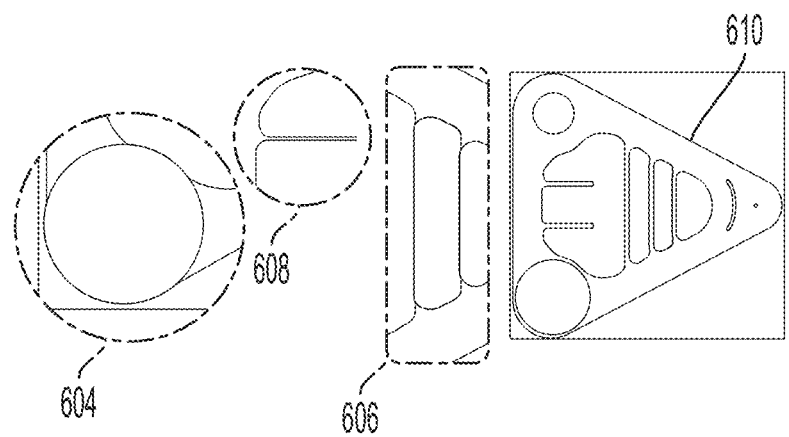

In FIGS. 3A-3E, a diagram illustrates the overview of a model correction approach according to an example embodiment. The input 3D shape B is voxelized such that each slice of voxels in z-direction represents a layer in the 3D printing process as seen in FIGS. 3A and 3B. Then, for each slice $S_i$, a meso-skeleton $\hat{M}_i$ is constructed, as shown in FIG. 3C. Similar to Min Equation (1), $\hat{M}_i$ defines the allowable region that the print head can traverse while printing. However, $\hat{M}_i$ contains additional skeletal paths for the features that are smaller than F in size. Therefore, sweeping the structuring element F over the meso-skeleton creates the corrected slice (see FIG. 3D) where the smallest feature is guaranteed to be equal or larger than F in size. Finally, stacking all the corrected slices together results in the corrected 3D model, as shown FIG. 3E. As seen in FIG. 4, Algorithm 1 summarizes the method. Here, V is the voxelized model, $\hat{V}$ is the corrected voxelization that includes corrected slices $\hat{S}_i$ and $\hat{B}$ represents the corrected surface mesh that is ready to be printed.

3.1 Meso-Skeleton Computation

The meso-skeleton of a slice is computed by performing a topology preserving thinning operation. Given an input slice $S_i$ represented by a binary image where white pixels represent internal points and black pixels are background, contour pixels are removed that are not essential to its topology. Iterative removal of such pixels results in a thinned image that is used as the meso-skeleton. As seen in FIG. 5, Algorithm 2 summarizes an approach to compute the meso-skeleton in detail. Algorithm 2 starts by computing the conventional erosion $E_i$ of the input slice. The erosion is used as an upper bound in the thinning process, such that the meso-skeleton cannot be shrunk beyond $E_i$. This can be ensured by performing thinning operations on the input image only until the union of the thinned image $\hat{M}_i$ with $E_i$ does not change.

A two-subiteration thinning algorithm as described in "Parallel thinning with two-subiteration algorithms" (*Communications of the ACM*, March 1989, vol. 32, issue 3, pp. 359-373, by Guo and Hall) may be employed here. In such an algorithm, the deletion or retention of a pixel p is determined by the configuration of the pixels in its local 8-connected neighborhood, N(p). Under this scheme, a contour pixel p is deleted if the relationships in Equation (3) below hold, where $X_H(p)$ is the crossing number and $x_k$ are the values of pixels in N(p) with k=1; . . . ; 8, starting with the east neighbor and numbered in counter-clockwise order. (see, e.g., "Thinning methodologies-a comprehensive survey," (*IEEE Trans. Pattern Anal. Mach. Intell.*, September 1992, vol. 14, issue 9, by Lam, Lee, and Suen; and "*Linear skeletons from square cupboards*," Machine Intelligence 4, 1969, p. 403, by Hilitch). In the first subiteration, pixels satisfying (a), (b), (c.1) and in the second subiteration, pixels satisfying (a), (b), (c.2) are removed.

$$\begin{aligned}
&(a)\ X_H(p) = 1 \\
&(b)\ 2 \le \min(n_1(p), n_2(p)) \le 3 \\
&n_1(p) = \sum_{k=1}^{4} x_{2k-1} \vee x_{2k}, \\
&n_2(p) = \sum_{k=1}^{4} x_{2k} \vee x_{2k+1}, \\
&(c.1)\ (x_2 \vee x_3 \vee \neg x_8) \vee x_1 = 0, \\
&(c.2)\ (x_6 \vee x_7 \vee \neg x_4) \vee x_5 = 0
\end{aligned} \quad (3)$$

With this approach, the object shrinks to an 8-connected skeleton when applied repeatedly, such that an object without holes reduces to a minimally connected stroke, whereas an object with holes shrinks to a connected ring halfway between each hole and the outer contour. Here, the connectedness is ensured through the constraint on the crossing number. As the Euler number is preserved, a meso-skeleton $\hat{M}_i$ that is homotopic to $S_i$ is generated. Moreover, this approach preserves a skeletal structure for geometrically distinct features such as protrusions, in addition to the topologically essential parts.

In FIGS. 6A-6D, images show the application of the algorithms described above to a test part according to an example embodiment. An example slice 600 of the test part is shown together with the corresponding meso-skeleton 602 created by the algorithm. Notice that skeletal paths are created for topologically important features such as 604 and 606 as well as geometrically distinct regions such as the protrusion in region 608. In the resulting corrected model 610, all of these problematic thin features are automatically thickened. The minimum printable feature 612 (or the structuring element) is shown in upper right corner in FIG. 6A.

For long and thin protrusions, the thinning operation in Equation (3) may converge to the skeletal structure quickly and terminate further removal of pixels. This tends to create undesirable overdepositions later in constructing the corrected model. An example problematic case is shown in FIG. 7. As the pixels 700 are assigned to be skeleton pixels in the thinning process, they do not get removed in later iterations resulting in protrusion 702 (grey region). However, following dilation operation of this meso-skeleton with F, the protrusion 702 extends farther to the right than what was originally designed (white region 704). This problem is addressed by detecting the spur pixels 708 that are not removed during the thinning process and removing them. To ensure that the protrusion has the intended length in the corrected model, this operation is performed only for the first d/2 iterations. The corrected protrusion 706 (grey region) has the same length as the originally designed spur 704.

4. Build Direction Optimization

As these shape modification methods mimic the additive manufacturing process and operates on the slice level, the quality of a printed part and thus, the correction result depends on the selected build direction. The amount of change in the shape (e.g., amount of added or removed material with the correction process) may be significantly different for different build directions. For instance, as shown in FIG. 8, a threaded cylinder 800 can be optimally 3D printed in a vertical orientation 802, while certain modifications (e.g., thickening and rounding sharp thread and cylinder edges) are required for the horizontal orientation 804 to be printable. Therefore, selecting the right build direction can minimize the difference between the designed shape and the manufactured object.

Formal definition of the build direction optimization problem is shown below in Equation (4), where $\theta$ is the vector of design variables and $\theta_1$ and $\theta_2$ denote the extrinsic Euler angles representing a sequential rotation of the build direction vector about the x and z axes, respectively. Note that the build direction is initialized at +z direction for $\theta=[0,0]^T$. As the slices are identical for any two opposite build directions, only the half-space is explored by setting the bounds for $\theta_1$ and $\theta_2$ as given in Equation (4).

$$\underset{\theta}{\text{minimize}} \; C(\theta) = \sum_i |\hat{S}_i(\theta) - S_i(\theta)| \quad (4)$$

$$\text{subject to } \theta_1 \in \left[-\frac{\pi}{2}, \frac{\pi}{2}\right] \text{ and } \theta_2 \in [0, \pi], \theta = [\theta_1, \theta_2]^T$$

The objective function in Equation (4) measures the absolute difference between the input shape and the corrected shape. Therefore, both the amount of added material through the thickening operations and the amount removed material due to the rounded corners/edges are taken into account in determining the optimum build direction. Note that it is also possible to enforce the optimizer to favor one over the other (e.g., material addition might be tolerated in some applications while removal is not) by constructing the objective function as a weighted sum of these two components. The objective function in Equation (4) corresponds to equally weighted sums in such formulation.

As the algebraic definition of the gradients are not available, a derivative-free simulated annealing approach can be used to solve the optimization problem. The simulated annealing algorithm is implemented as described in "Optimization by simulated annealing" (*Science*, 1983, vol. 220, issue 4598, pp. 671-680, by Kirkpatrick, Gelatt, and Vecchi). The algorithm mimics the thermal annealing process of heating and slowly lowering the temperature of a part to minimize system energy. At each optimization step, new candidate states are generated by sampling a new design vector around the current state. The new states are drawn from a Gaussian distribution. Variance of the distribution is proportional to the temperature of the system. Since the optimization starts with a high temperature value that decreases through the iterations, the extent of the search (e.g., the distance of the new point from the current point) is higher at the beginning of the optimization allowing a broad search and gets smaller as the optimization converges. Any new state with a lower objective value is accepted. However, the algorithm allows accepting a solution with a higher objective value through a certain probability and alleviates the issue of getting stuck at a local minima. For cooling schedules, exponential cooling is used in all of the examples. Linear and logarithmic cooling schedules have also be explored and resulted in similar convergence properties.

5. Results

Figure 9:
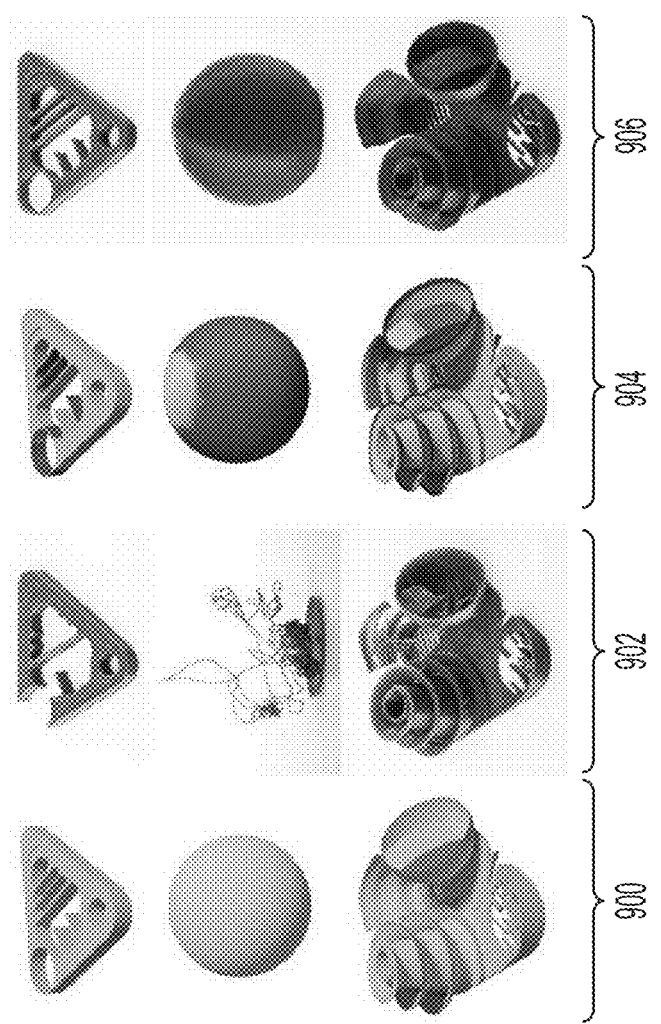
FIG. 9 is a set of images showing some results of meso-skeleton-based model correction according to example embodiments.

The images in FIG. 9 illustrate the results of meso-skeleton-based model correction on various models. Images 900 show the input uncorrected models and images 902 are photos of the corresponding failed prints based on the uncorrected models. Images 904 are the corrected models and photos 906 are of the successful prints. Added and removed material are highlighted in darker regions of images 904. Here, the build direction is assumed to be $\theta=[0,0]$. The meso-skeleton approach detects the problematic regions and modifies each layer automatically to make them manufacturable. Printed results verify the method that manufacturing failures are resolved in the corrected models. Note that in some extreme cases such as the uniform thickness spherical shell model (middle row), the correction makes the completely unprintable model printable using the same manufacturing process and same set of process parameters. Similarly, disappearing regions that are geometrically or topologically important in the design are recovered for the test part (top row) and the playground (bottom row). Table 1 summarizes the model correction results with various metrics relevant to these models.

TABLE 1

Performance of model correction algorithm on different models

| Model | Slices | Image Size | Time (s) |
|---|---|---|---|
| Test Part | 65 | [583 × 597] | 3.44 |
| Molecule | 383 | [513 × 462] | 11.22 |
| Threaded cylinder | 421 | [623 × 632] | 44.78 |
| Spherical shell | 712 | [795 × 795] | 67.96 |
| Playground | 555 | [1417 × 1479] | 187.57 |
| Dragon | 687 | [284 × 253] | 4.86 |
| Helical tower | 1472 | [376 × 382] | 27.75 |

Figure 10:
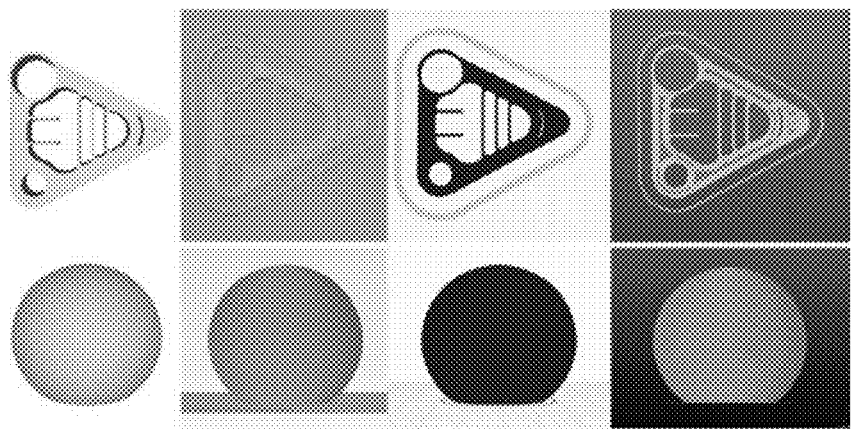
FIG. 10 is a set of images showing the toolpaths generated by different slicer software for the corrected models according to example embodiments.

In FIG. 10, images show the toolpaths generated by different slicer software for the corrected test part and spherical shell models. Unlike the toolpaths generated for the original models (see FIG. 2), there are no ambiguities in the resulting shape, such that all the slicers were able to generate similar results with no indication of any fabrication failure.

Figure 11:
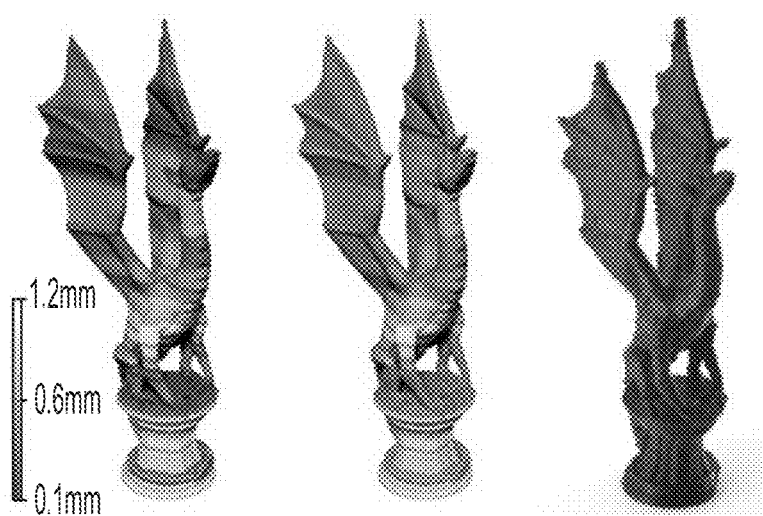
FIG. 11 is a set of images showing distribution of structuring element sizes on an example model.

As the meso-skeleton is generated through iterative removal of contour pixels, the exact state where the skeleton is reduced to a single pixel wide line for the first time can be computed. At this state, the number of removed contour layers corresponds to the maximum allowable structuring element size to print the current slice without making any topologically or geometrically important changes. This allows specifying a per-layer structuring element size that can be used to fabricate the input geometry without requiring any correction. FIG. 11 illustrates the distribution of the required structuring element size on an example model. It can be observed that for layers involving thin features (such as the tip of the wings, the claws and the wing membranes), the algorithm suggests smaller structuring elements as expected.

In order to validate this result, an open-source slicer (gsSlicer) was modified to adjust the extrusion width for each layer individually in the FDM toolpath generation. Due to the physical constraints of the printer, the change in the extrusion width was limited to 2× only by setting the allowable range to 0:6-1:2 mm. In that case, it can be observed in FIG. 11 (middle) that layers containing critical features are assigned the lower bound value. Such an adjustment in the extrusion width results in ~8% decrease in the build time as the layers without any critical features can be printed faster using a larger extrusion width. The improvement in build time can be more significant for complex models containing large bulky regions with more localized small and thin features.

Figure 12:
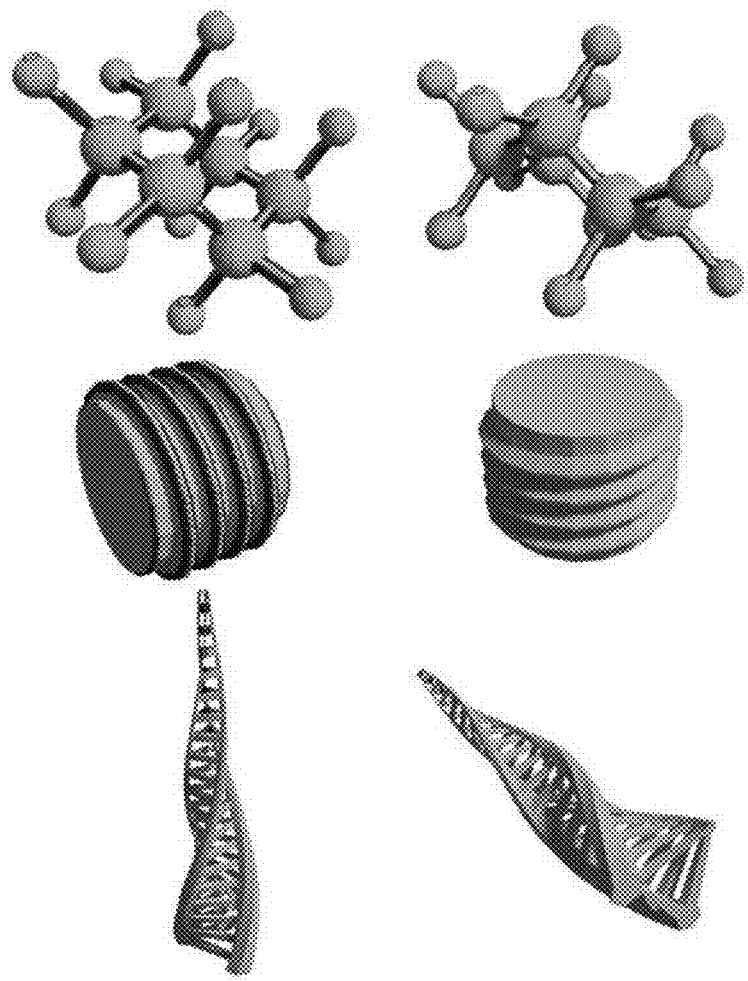
FIG. 12 is a set of images showing build direction optimization results according to example embodiments.

The images in FIG. 12 and FIG. 1 illustrate build direction optimization results. This optimization results in ~15% to ~50% reduction in the objective value for the molecule, the dragon and helical tower models. In order to validate the optimization approach, the threaded cylinder model was also analyzed. The optimizer was able to converge to the solution of the vertical print configuration at which the model can be printed almost perfectly. It can be observed that major problems in the horizontal orientation including the rounding of the cylinder edges and the thickening of the sharp threads are avoided in the vertical orientation, resulting in ~98% reduction in the objective value. Table 2 summarizes the build direction optimization results together with other performance metrics.

TABLE 2

Performance of build direction optimization on different models

| Model | Objective Value | | θ | Time |
| --- | --- | --- | --- | --- |
| | Initial | Optimized | | |
| Molecule | 180661 | 118927 | [−.75, 0.03] | 62 m |
| Threaded cylinder | 2040590 | 26687 | [1.52, 0.00] | 3 h 56 m |
| Dragon | 131748 | 63694 | [−1.98, 1.57] | 35 m |
| Helical tower | 134276 | 112601 | [−1.51, 1.09] | 2 h 31 m |

Figure 13:
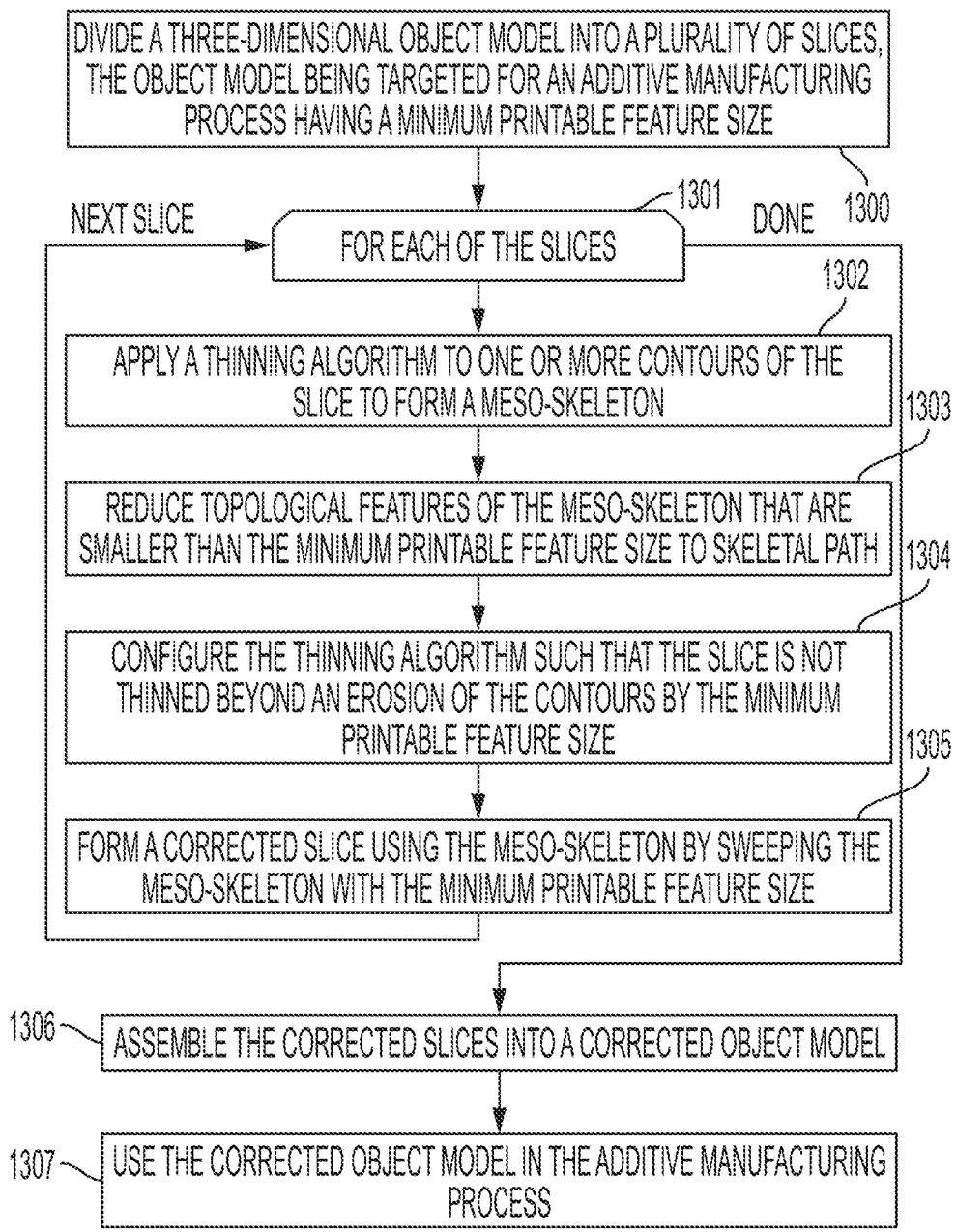
FIGS. 13 and 14 are flowcharts of methods according to example embodiments.

In FIG. 13, a flowchart shows a method according to an example embodiment. The method involves dividing 1300 a three-dimensional object model into a plurality of slices. The object model is targeted for an additive manufacturing process having a minimum printable feature size. Loop limit 1301 indicates processing operations performed for each of the slices. These operations include applying 1302 a thinning algorithm to one or more contours of the slice to form a meso-skeleton. For this thinning algorithm, topological features of the meso-skeleton that are smaller than the minimum printable feature size are reduced 1303 to skeletal paths. The thinning algorithm is configured 1304 such that the slice is not thinned beyond an erosion of the contours by the minimum printable feature size. The meso-skeleton is used to form 1305 a corrected slice using the by sweeping the meso-skeleton with the minimum printable feature size. After completion of the loop 1301 (e.g., after all slices have been processed), the corrected slices are assembled 1306 into a corrected object model. The corrected object model is used in the additive manufacturing process, e.g., to ensure the object model is manufacturable while maintaining topologically important features. This method can be performed in a design stage, such that the corrected model is processed by a slicer and toolpath generator specific to the additive manufacturing machines.

Figure 14:
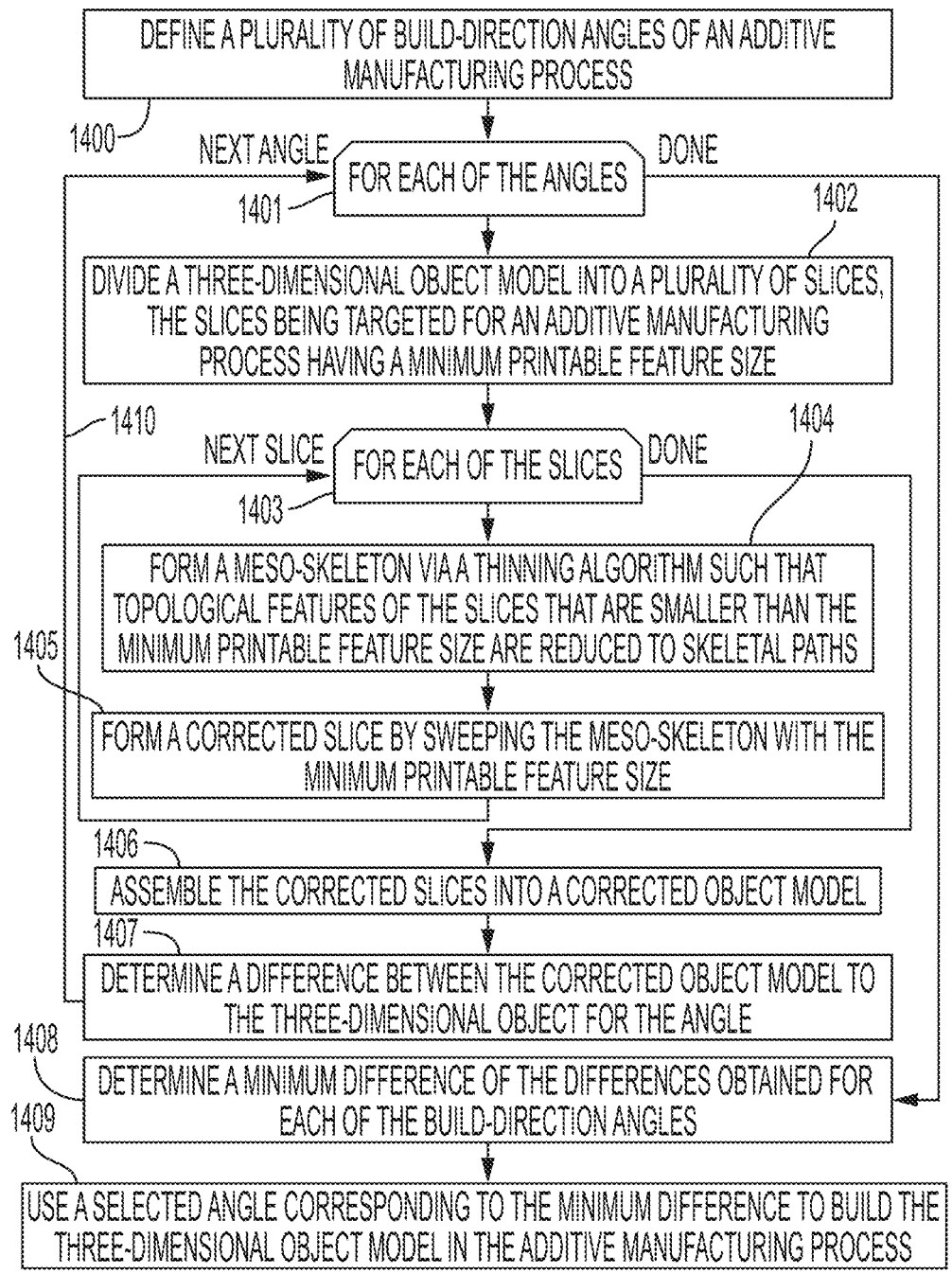

In FIG. 14, a flowchart shows a method according to another example embodiment. The method involves defining 1400 a plurality of build-direction angles of an additive manufacturing process. Note that all of angles need not be predefined. For example, a next angle may be selected based on previously evaluated angles inside an optimization loop, such that the angle is selected to reduce an error between a corrected model at each angle and the original model. Outer loop 1401 iterates through each of the angles where a computation is performed. The computation involves dividing 1402 a three-dimensional object model into a plurality of slices. The slices are targeted for an additive manufacturing process having a minimum printable feature size.

Inner loop 1403 involves, for each of the slices, forming 1404 a meso-skeleton via a thinning algorithm such that topological features of the slice that are smaller than the minimum printable feature size are reduced to skeletal paths. A corrected slice is formed 1405 by sweeping the meso-skeleton with the minimum printable feature size. After all the slices have been processed, the corrected slices are assembled 1406 into a corrected object model. A difference between the corrected object model and the three-dimensional object for the angle is determined 1407. For each angle, the next orientation angle is selected 1410 based on the previously evaluated orientation angles inside an optimization loop. After all angles are processed, a minimum difference of the differences obtained for each of the build-direction angles is determined 1408. A selected angle corresponding to the minimum difference is used 1409 to build the three-dimensional object model in the additive manufacturing process.

Figure 15:
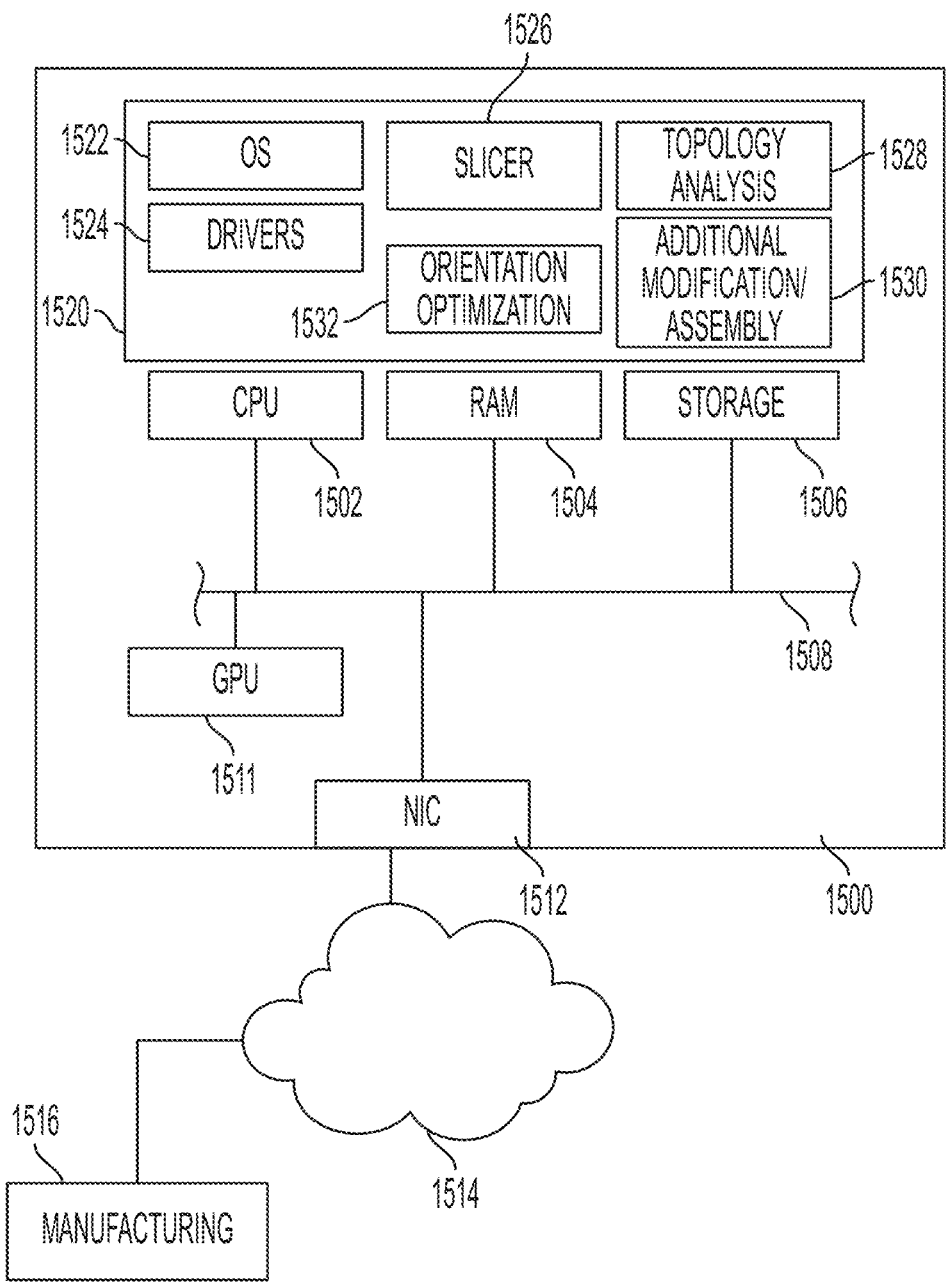
FIG. 15 is a block diagram of an apparatus according to an example embodiment.

The methods and processes described above can be implemented on computer hardware, e.g., workstations, servers, as known in the art. In FIG. 15, a block diagram shows an apparatus 1500 that may be used to implement methods according to an example embodiment. The apparatus 1500 includes one or more processors 1502 such as a central processing unit, co-processor, digital signal processor, etc. The processor 1502 is coupled to memory, which may include both random access memory 1504 and persistent storage 1506, via one or more input/output busses 1508. Other general-purpose or special-purpose hardware may be coupled to the bus 1508, such as graphics processing unit (GPU) 1515 and network interface 1512. Note that the functions of the apparatus 1500 described below may be implemented via multiple devices, e.g., via client-server arrangement, clustered computing, cloud computing, etc.

The network interface 1512 facilitates communications via a network 1514 with a manufacturing system 1516, using wired or wireless media. The manufacturing system may include at least one additive manufacturing machine as well as pre-processors, formatters, etc., that prepare data models for use by the manufacturing machines. Data may also be transferred to the manufacturing system 1516 using non-network transport, e.g., via portable data storage drives, point-to-point communication, etc.

The apparatus 1500 includes software 1520 that facilitates optimizing geometry models for manufacture on additive manufacturing machines. The software 1520 includes an operating system 1522 and drivers 1524 that facilitate communications between user-level programs and the hardware. The software 1520 may also include a slicer 1526 that decomposes a three-dimensional model into two-dimensional slices. The slicer 1526 may have knowledge of particular slicer processes used to form toolpaths for the manufacturing system 1516, however this is not required. Advantageously, the slicer 1526 and other processing modules 1528, 1530 can prepare manufacturable models with only minimal information of the target manufacturing machine, e.g., minimum printable feature size, layer thickness, etc.

A topology analysis module 1528 analyses the slices and determines a meso-skeleton for each slice. The module 1528 may use any thinning algorithm, although specific examples are described above. The meso-skeleton ensures that topological features of the slice that are smaller than the minimum printable feature size are reduced to skeletal paths, such that a corrected slice can be formed by sweeping the meso-skeleton with the minimum printable feature size.

An additional modification module 1530 may further process the slices to optionally correct certain side effects of the skeletonization of the slices. For example, spurs and other protrusions that are smaller than the minimum printed feature size may extend out further than what is in the model due to the thickening of the spur or other protrusion. The module 1530 may be configured to correct these side effects, e.g., removing end pixels from the spurs. The module 1530 is also configured to assemble the corrected slices into a corrected 3-D model that can then be sent to the manufacturing system 1516.

An orientation optimization module 1532 may utilize the processing modules 1526, 1528, 1530 to further optimize the model for manufacturing. The orientation optimization module 1532 simulates a plurality of build orientations of the model, and based on the topology analysis, can determine differences between the corrected model and original model for each build orientation. The orientation that has a minimum difference is the one that will be most topologically faithful to the original model yet can still be manufacturable by the system 1516 to a high level of confidence.

As noted above in the description of FIG. 11, processes are described that allow changing manufacturing element size (e.g., extrusion width, deposition size) on a per-layer basis based on a meso-skeleton analysis. This can be used to minimize production cost by reducing time needed for the entire build, while still producing a part to target specifications. For example, if a machine is operable to deposit material at a deposition size ranging between different minimum and maximum printable feature sizes (inclusive), then layers may generally be formed faster by using the largest, slice-specific size, which will require fewer traversals of the print head. The deposition size for a particular layer is related to process parameters such as filament feed rate in FDM, number of active (or open) nozzles in multi-nozzle printing, beam/laser power and velocity in powder based printing methods (including some metal printing approaches such as EBM and direct metal laser sintering) etc. These process parameters can be selected based on the suggested per-layer deposition size (slice-specific feature size).

Also described above is an embodiment where a model is analyzed at different build directions to determine which direction minimizes a difference between an as-designed shape and a manufactured shape. This analysis can be extended to also determine, for each orientation, adjusted slices that use the largest available material deposition size. Thus, the designer will have not only an indication of the orientations that will produce the highest fidelity, but may also have at least an indication of how the optimum orientation may impact build time. In other embodiments, the objective function C(θ) in Equation (4) may be extended to include some measure of build time, such that it optimizes both geometry and build time. The effects of geometry and build time on the results may be balanced, e.g., by weighting the different components of the objective function.

The various embodiments described above may be implemented using circuitry, firmware, and/or software modules that interact to provide particular results. One of skill in the arts can readily implement such described functionality, either at a modular level or as a whole, using knowledge generally known in the art. For example, the flowcharts and control diagrams illustrated herein may be used to create computer-readable instructions/code for execution by a processor. Such instructions may be stored on a non-transitory computer-readable medium and transferred to the processor for execution as is known in the art. The structures and procedures shown above are only a representative example of embodiments that can be used to provide the functions described hereinabove.

Unless otherwise indicated, all numbers expressing feature sizes, amounts, and physical properties used in the specification and claims are to be understood as being modified in all instances by the term "about." Accordingly, unless indicated to the contrary, the numerical parameters set forth in the foregoing specification and attached claims are approximations that can vary depending upon the desired properties sought to be obtained by those skilled in the art utilizing the teachings disclosed herein. The use of numerical ranges by endpoints includes all numbers within that range (e.g. 1 to 5 includes 1, 1.5, 2, 2.75, 3, 3.80, 4, and 5) and any range within that range.

The foregoing description of the example embodiments has been presented for the purposes of illustration and description. It is not intended to be exhaustive or to limit the embodiments to the precise form disclosed. Many modifications and variations are possible in light of the above teaching. Any or all features of the disclosed embodiments can be applied individually or in any combination and are not meant to be limiting, but purely illustrative. It is intended that the scope of the invention be limited not with this detailed description, but rather determined by the claims appended hereto.

The invention claimed is:

1. A method comprising:
for each build orientation of a plurality of build orientations of a three-dimensional model targeted for an additive manufacturing process that deposits material at a minimum printable feature size to build a manufactured object based on the three-dimensional model, performing an optimization loop comprising:
dividing the three-dimensional model into a plurality of slices corresponding to the build orientation;
applying a thinning algorithm to each of the slices to form meso-skeletons such that topological features of the respective slices that are smaller than the minimum printable feature size are reduced to skeletal paths;
forming corrected slices by sweeping the meso-skeletons with the minimum printable feature size;
assembling the corrected slices into a corrected object model; and
determining a difference between the corrected object model and the three-dimensional model;
determining a minimum one of the differences based on the optimization loops and an optimum build orientation corresponding to the minimum difference; and
building the manufactured object at the optimum build orientation using the additive manufacturing process.

2. The method of claim 1, wherein the manufactured object is created based on the corrected object model corresponding to the optimum build orientation.

3. The method of claim 1, wherein the thinning algorithm comprises a two sub-iteration thinning algorithm.

4. The method of claim 1, wherein the meso-skeletons are homotopic to the respective slices.

5. The method of claim 1, wherein determining the difference between the corrected object model and the three-dimensional model comprises using a simulated annealing algorithm.

6. The method of claim 1, wherein determining the difference between the corrected object model and the three-dimensional model is based on both an amount of added material through thickening operations and an amount of removed material due to rounding of corners or edges.

7. The method of claim 6, wherein one of the amount of added material and the amount of removed material is favored in determining the difference by using a weighted objective function.

8. The method of claim 1, wherein the plurality of build orientations are selected based on previously evaluated orientations inside the optimization loops, such that a next orientation is selected to reduce an error between the corrected model at each orientation and the three-dimensional model.

9. The method of claim 1, wherein the skeletal paths are a single pixel wide.

10. The method of claim 1, wherein the build orientations are defined as two extrinsic Euler angles representing a sequential rotation of a build direction vector about two orthogonal axes.

11. A system comprising:
an additive manufacturing machine that deposits material at a minimum printable feature size;
a non-transitory memory storing a three-dimensional model of a manufactured object targeted for the additive manufacturing machine; and
a hardware processor coupled to the non-transitory memory, the processor configured to:
for each build orientation of a plurality of build orientations of the additive manufacturing machine, perform an optimization loop comprising:
dividing the three-dimensional model into a plurality of slices corresponding to the build orientation;
applying a thinning algorithm to each of the slices to form meso-skeletons such that topological features of the respective slices that are smaller than the minimum printable feature size are reduced to skeletal paths;
forming corrected slices by sweeping the meso-skeletons with the minimum printable feature size;
assembling the corrected slices into a corrected object model; and
determining a difference between the corrected object model and the three-dimensional model; and
determine a minimum one of the differences based on the optimization loops and an optimum build orientation corresponding to the minimum difference, the additive manufacturing machine building the manufactured object at the optimum build orientation.

12. The system of claim 11, wherein the manufactured object is created based on the corrected object model corresponding to the optimum build orientation.

13. The system of claim 11, wherein the thinning algorithm comprises a two sub-iteration thinning algorithm.

14. The system of claim 11, wherein the meso-skeletons are homotopic to the respective slices.

15. The system of claim 11, wherein determining the difference between the corrected object model and the three-dimensional model comprises using a simulated annealing algorithm.

16. The system of claim 11, wherein determining the difference between the corrected object model and the three-dimensional model is based on both an amount of added material through thickening operations and an amount of removed material due to rounding of corners or edges.

17. The system of claim 16, wherein one of the amount of added material and the amount of removed material is favored in determining the difference by using a weighted objective function.

18. The system of claim 11, wherein the plurality of build orientations are selected based on previously evaluated orientations inside the optimization loops, such that a next orientation is selected to reduce an error between the corrected model at each orientation and the three-dimensional model.

19. The system of claim 11, wherein the skeletal paths are a single pixel wide.

20. The system of claim 11, wherein the build orientations are defined as two extrinsic Euler angles representing a sequential rotation of a build direction vector about two orthogonal axes.

* * * * *